United States Patent
Yi et al.

(10) Patent No.: US 11,955,289 B2
(45) Date of Patent: Apr. 9, 2024

(54) MULTILAYER CAPACITOR

(71) Applicant: SAMSUNG ELECTRO-MECHANICS CO., LTD., Suwon-si (KR)

(72) Inventors: Young Soo Yi, Suwon-si (KR); Kun Ho Koo, Suwon-si (KR); San Kyeong, Suwon-si (KR); Hai Joon Lee, Suwon-si (KR); Kyung Ryul Lee, Suwon-si (KR); Ho Yeol Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 50 days.

(21) Appl. No.: 17/720,729

(22) Filed: Apr. 14, 2022

(65) Prior Publication Data

US 2023/0178302 A1 Jun. 8, 2023

(30) Foreign Application Priority Data

Dec. 8, 2021 (KR) ........................ 10-2021-0174378

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/12* (2013.01); *H01G 4/232* (2013.01); *H01G 4/248* (2013.01)

(58) Field of Classification Search
CPC ............ H01G 4/30; H01G 4/12; H01G 4/248; H01G 4/012; H01G 4/1227; H01G 4/2325;
(Continued)

(56) References Cited

U.S. PATENT DOCUMENTS

2009/0323253 A1* 12/2009 Kobayashi ............. H01G 4/005
427/79
2013/0170095 A1* 7/2013 Oh ......................... H01G 4/008
361/305
(Continued)

FOREIGN PATENT DOCUMENTS

| JP | 2003-059758 A | 2/2003 |
| JP | 3391286 B2 | 3/2003 |
| JP | 2017-022365 A | 1/2017 |

*Primary Examiner* — Michael P McFadden
(74) *Attorney, Agent, or Firm* — Morgan, Lewis & Bockius LLP (57) ABSTRACT

A multilayer capacitor includes a body including a stack structure in which at least one first internal electrode and at least one second internal electrode are alternately stacked in a first direction with at least one dielectric layer interposed therebetween; and first and second external electrodes spaced apart from each other and disposed on the body to be respectively connected to the at least one first internal electrode and the at least one second internal electrode, wherein each of the first and second external electrodes includes a first conductive layer including a first conductive material and glass; and an oxide layer including an oxide and disposed on at least a portion of an external surface of the first conductive layer.

24 Claims, 11 Drawing Sheets

(51) Int. Cl.
*H01G 4/012* (2006.01)
*H01G 4/12* (2006.01)
*H01G 4/232* (2006.01)
*H01G 4/248* (2006.01)

(58) Field of Classification Search
CPC ...... H01G 4/1209; H01G 4/228; H01G 4/306; H01G 2/02; H01G 4/008; H01G 4/1218; H01G 4/32
See application file for complete search history.

(56) References Cited

U.S. PATENT DOCUMENTS

| | | | |
|---|---|---|---|
| 2016/0086733 A1* | 3/2016 | Saito | H01G 4/1227 205/183 |
| 2017/0018361 A1 | 1/2017 | Nishisaka | |
| 2021/0012964 A1* | 1/2021 | Lee | H01G 4/232 |
| 2021/0065982 A1* | 3/2021 | Jung | H01G 4/2325 |
| 2021/0125780 A1* | 4/2021 | Hayashi | H01G 4/248 |
| 2021/0151252 A1* | 5/2021 | Nakamura | H01G 4/30 |
| 2021/0375549 A1* | 12/2021 | Okada | H01G 4/012 |
| 2022/0013291 A1* | 1/2022 | Nishisaka | H01G 4/1227 |

\* cited by examiner

MULTILAYER CAPACITOR

CROSS-REFERENCE TO RELATED APPLICATION(S)

This application claims benefit of priority to Korean Patent Application No. 10-2021-0174378 filed on Dec. 8, 2021 in the Korean Intellectual Property Office, the disclosure of which is incorporated herein by reference in its entirety.

TECHNICAL FIELD

The present disclosure relates to a multilayer capacitor.

BACKGROUND

A multilayer capacitor is widely used as a component for electronic devices such as computers, PDAs, and mobile phones, due to advantages thereof such as guaranteed high capacitance even with a small size, and ease of mounting thereof, and is widely used as a component for electric devices (including vehicles) due to high reliability and desirable characteristics such as high strength.

The multilayer capacitor may include an external electrode for providing external capacitance, and the external electrode may require reliability to be stably mounted or embedded in a substrate or an electronic device, require reliability to prevent penetration of moisture and/or plating solution into the multilayer capacitor, require durability to withstand external shocks and temperature changes, require stacking stability for an internal structure or an external structure of the external electrode, or require low equivalent series resistance (ESR).

SUMMARY

An aspect of the present disclosure is to provide a multilayer capacitor capable of efficiently improving performance of an external electrode (e.g., at least portion of reliability, durability, stacking stability, or a reduction in equivalent series resistance).

According to an aspect of the present disclosure, a multilayer capacitor includes a body including a stack structure in which at least one first internal electrode and at least one second internal electrode are alternately stacked in a first direction with at least one dielectric layer interposed therebetween; and first and second external electrodes spaced apart from each other and disposed on the body to be respectively connected to the at least one first internal electrode and the at least one second internal electrode, wherein each of the first and second external electrodes includes a first conductive layer including a first conductive material and glass; and an oxide layer including an oxide and disposed on at least a portion of an external surface of the first conductive layer.

According to another aspect of the present disclosure, a multilayer capacitor includes a body including a stack structure in which at least one first internal electrode and at least one second internal electrode are alternately stacked in a first direction with at least one dielectric layer interposed therebetween; and first and second external electrodes spaced apart from each other and disposed on the body to be respectively connected to the at least one first internal electrode and the at least one second internal electrode, wherein each of the first and second external electrodes includes a first conductive layer including a first conductive material; a second conductive layer including a second conductive material having a standard reduction potential, higher than a standard reduction potential of the first conductive material, and contacting a portion of an external surface of the first conductive layer; and an oxide layer disposed between another portion of the external surface of the first conductive layer and the second conductive layer, and including an oxide of the first conductive material.

According to another aspect of the present disclosure, a method of manufacturing a multilayer capacitor includes forming a second conductive layer on a first conductive layer disposed on a portion of a body of the multilayer capacitor, the forming of the second conductive layer includes contacting a paste with a first portion of an external surface of the first conductive layer but not a second portion of the external surface of the first conductive layer, wherein the first conductive layer includes a first conductive material and a glass frit; and oxidizing the second portion of the external surface of the first conductive layer to form an oxide layer including an oxide.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Embodiments of the present disclosure can be modified into various other forms, and the scope of the present disclosure is not limited to the embodiments described below. Furthermore, the embodiments of the present disclosure are provided to more fully describe the present disclosure to those skilled in the art. Accordingly, the shapes and sizes of the elements in the drawings may be exaggerated for clarity of description, and the elements denoted by the same reference numerals in the drawings are the same elements.

In order to clearly illustrate the present disclosure in the drawings, thicknesses have been enlarged for the purpose of clearly illustrating the layers and regions, and an element having the same function within the scope of the same idea may be explained using the same symbol.

Throughout the specification, when an element is referred to as "comprising," it means that it can include other elements as well, without excluding other elements unless specifically stated otherwise.

When the direction of the parallelepiped is defined to clearly describe the embodiments of the present disclosure, L, W, and T indicated in the drawings represent a length direction, a width direction, and a thickness direction, respectively. In this case, the thickness direction may be used as the same concept as the stacking direction in which the dielectric layers are stacked.

Hereinafter, a multilayer capacitor according to an embodiment will be described, and in detail, a multilayer ceramic capacitor (MLCC) will be described, but the present disclosure is not limited thereto.

Hereinafter, a multilayer capacitor according to an exemplary embodiment of the present disclosure will be described, in particular, a multilayer ceramic capacitor, but the present disclosure is not limited thereto.

Figure 1:
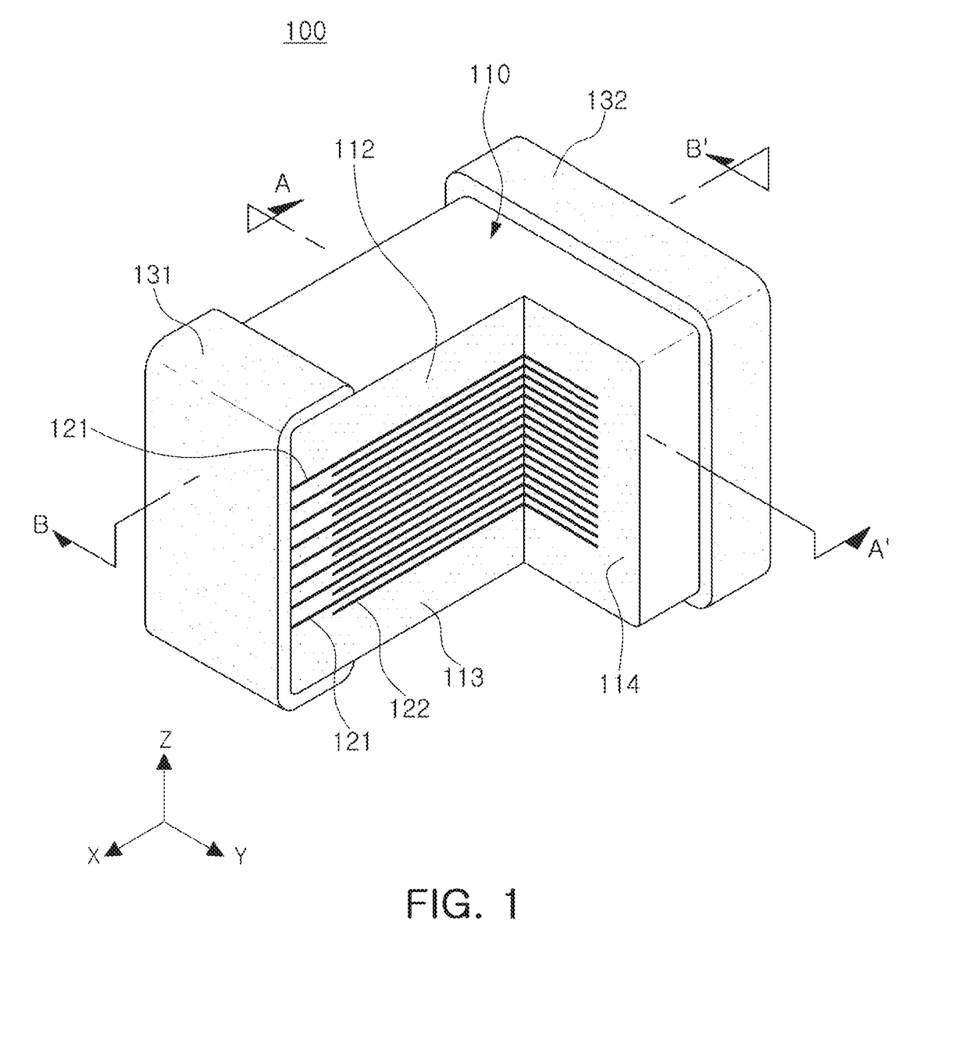
FIG. 1 is a perspective view illustrating a multilayer capacitor according to an embodiment of the present disclosure.
Figure 2:
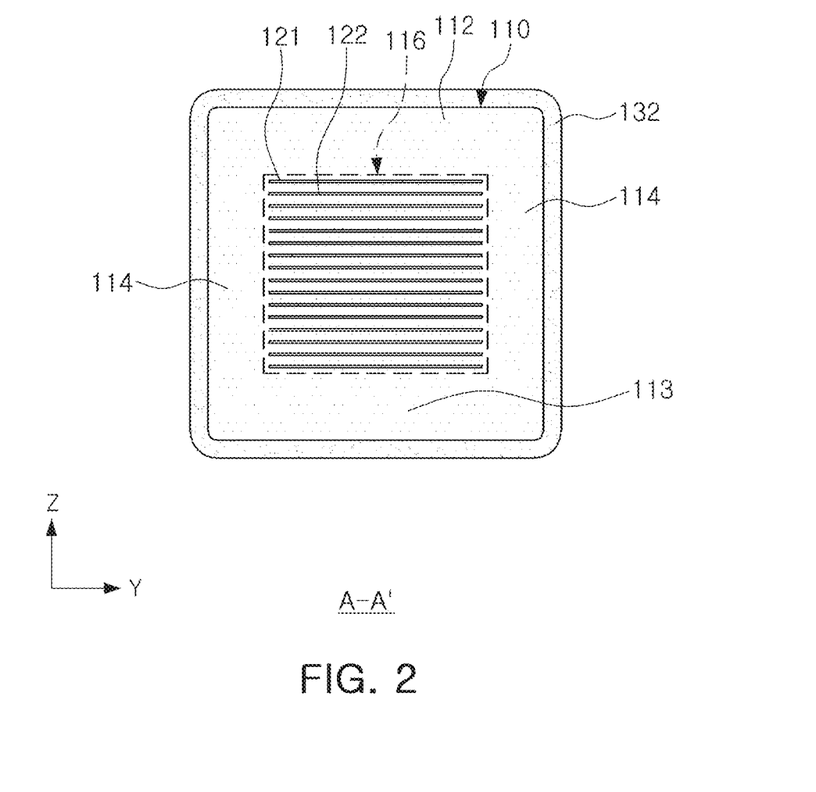
FIG. 2 is a cross-sectional view of the multilayer capacitor of FIG. 1, taken along line A-A'.
Figure 3A:
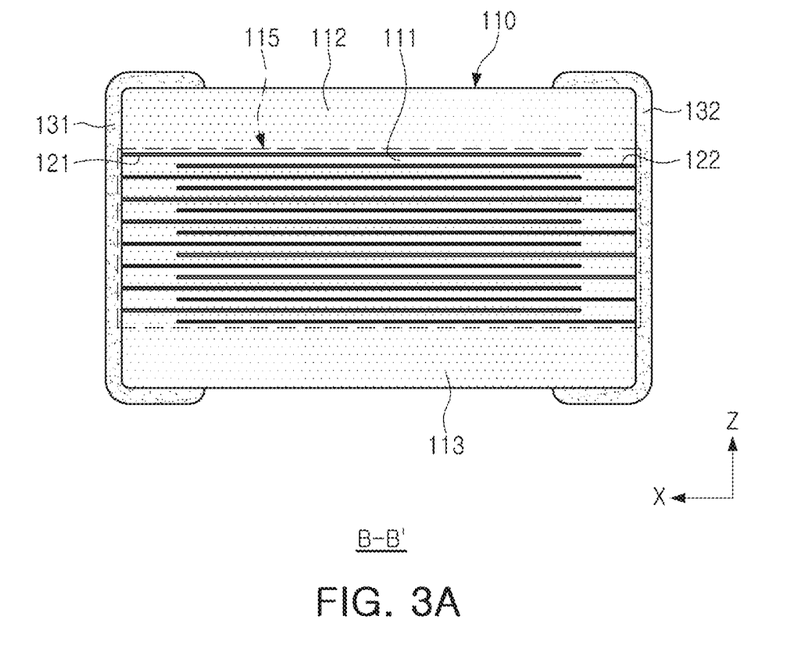
FIG. 3A is a cross-sectional view of the multilayer capacitor of FIG. 1, taken along line B-B'.

FIG. 1 is a perspective view illustrating a multilayer capacitor according to an embodiment of the present disclosure, FIG. 2 is a cross-sectional view of the multilayer capacitor of FIG. 1, taken along line A-A', and FIG. 3A is a cross-sectional view of the multilayer capacitor of FIG. 1, taken along line B-B'. Although FIG. 1 illustrates a shape cut by about ¼ of a total volume thereof to show an interior of a body 110, an actual multilayer capacitor 100 may not be cut by about ¼ of a volume thereof, and may have an approximately symmetrical form with respect to the respective directions of the X direction, the Y direction, and the Z direction from a center.

Referring to FIGS. 1, 2 and 3A, a multilayer capacitor 100 according to an embodiment of the present disclosure may include a body 110, a first external electrode 131, and a second external electrode 132.

The body 110 may have a stack structure in which at least one first internal electrode 121 and at least one second internal electrode 122 are alternately stacked in a first direction (e.g., the Z-direction) with at least one dielectric layer 111 interposed therebetween.

For example, the body 110 may be formed as a ceramic body by sintering the stack structure. In this case, at least one dielectric layer 111 disposed in the body 110 is in a sintered state, and boundaries between adjacent dielectric layers may be integrated to the extent that it is difficult to check without using a scanning electron microscope (SEM).

For example, the body 110 may be formed as a hexahedron having both side surfaces in the length direction X, both sides in the width direction Y, and both side surfaces in the thickness direction Z, and edges and corners of the hexahedron may be rounded as they are polished. A shape and a size of the body 110 and the number of stacked dielectric layers 111 are not limited to those illustrated in the present embodiment.

A thickness of the at least one dielectric layer 111 may be arbitrarily changed according to a capacitance design of the multilayer capacitor 100, and may include a ceramic powder having a high dielectric constant, for example, a barium titanate ($BaTiO_3$)-based powder. The present disclosure is not limited thereto. In addition, various ceramic additives (e.g., MgO, $Al_2O_3$, $SiO_2$, ZnO), organic solvents, plasticizers, binders, dispersants, or the like may be added to the ceramic powder according to the required specifications of the multilayer capacitor 100.

An average particle diameter of the ceramic powder used to form the at least one dielectric layer 111 is not particularly limited, and may be adjusted according to a required standard of the multilayer capacitor 100 (e.g., miniaturization and/or high capacitance in, for example, a capacitor for electronic devices, or high withstand voltage characteristics and/or strong strength in, for example, a capacitor for electrical devices), but may be adjusted to, for example, 400 nm or less.

For example, the at least one dielectric layer 111 may be formed by applying and drying a slurry formed including powder such as barium titanate ($BaTiO_3$) on a carrier film and thus providing a plurality of ceramic sheets. The ceramic sheet may be formed by preparing a slurry by mixing ceramic powder, a binder, and a solvent, and preparing the slurry in a sheet shape having a thickness of several μm by a doctor blade method, but the formation method is not limited thereto.

The at least one first internal electrode 121 and the at least one second internal electrode 122 may be formed by printing a conductive paste including a conductive metal, to be alternately exposed to one side and the other side of the body 110 in the direction X, in the stacking direction (e.g., the Z-direction) of the dielectric layers. The at least one first internal electrode 121 and the at least one second internal electrode 122 may be electrically insulated from each other by a dielectric layer interposed therebetween.

For example, each of the at least one first internal electrode 121 and the at least one second internal electrode 122 may be formed of a conductive paste for an internal electrode, having an average particle size of 0.1 to 0.2 μm and having 40 to 50% by weight, but the material is not limited thereto. The conductive paste may be one of nickel (Ni), copper (Cu), palladium (Pd), silver (Ag), lead (Pb) or platinum (Pt) alone, or alloys thereof, but the present disclosure is not limited thereto.

For example, an internal electrode pattern may be formed by coating the internal electrode conductive paste on the ceramic sheet by a printing method or the like. As the method of printing the conductive paste, a screen-printing method, a gravure printing method, an inkjet printing method, or the like may be used, but the present disclosure is not limited thereto. For example, the body 110 may be manufactured by stacking 200 to 300 layers of the ceramic sheet on which the internal electrode pattern is printed, pressing, and sintering the same.

The capacitance of the multilayer capacitor 100 may be proportional to an overlapping area of the at least one first internal electrodes 121 and the at least one second internal electrodes 122 in the stacking direction (e.g., in the Z-direction), be proportional to the total number of stacking of the at least one first internal electrodes 121 and the at least one second internal electrodes 122, and be inversely proportional to a distance between the at least one first internal electrode 121 and the at least one second internal electrode 122. The distance may be substantially equal to the thickness of the at least one dielectric layer 111.

The multilayer capacitor 100 may have a relatively greater capacitance, compared to a thickness, as the distance between the at least one first internal electrode 121 and the at least one second internal electrode 122 decreases. A withstand voltage of the multilayer capacitor 100 may be increased as the distance increases. Therefore, the distance between the internal electrodes may be adjusted according to the required standard of the multilayer capacitor 100 (e.g., requirements for miniaturization and/or high capacitance such as in a capacitor for electronic devices, requirements for high withstand voltage characteristics and/or strong strength such as in a capacitor for an electric device, or the like). A thickness of each of the at least one first internal electrode 121 and the at least one second internal electrode 122 may also be affected by the distance between the internal electrodes.

For example, in the multilayer capacitor 100, when relatively high withstand voltage characteristics and/or strong strength are required, the distance between the at least one first internal electrode 121 and the at least one second internal electrode 122 may be designed to exceed twice each thickness. For example, when miniaturization and/or high capacitance are required, the multilayer capacitor 100 may be designed such that each of the first internal electrode 121 and the second internal electrode 122 has a thickness of 0.4 μm or less and the total number of stacks thereof is 400 or more.

The first and second external electrodes 131 and 132 may be disposed on the body 110 to be spaced apart from each other to be connected to the at least one first internal electrode 121 and the at least one second internal electrode 122, respectively.

For example, each of the first and second external electrodes 131 and 132 may be formed by a process of dipping in a paste containing a metal component, a process of printing a conductive paste, a sheet transfer process, a pad transfer process, a sputter plating process, an electrolytic plating process, or the like. For example, each of the first and second external electrodes 131 and 132 may include a sintered layer formed as the paste is sintered, and a plating layer formed on an external surface of the sintered layer, and may further include a conductive resin layer disposed between the sintered layer and the plating layer. For example, the conductive resin layer may be formed as conductive particles are contained in a thermosetting resin such as epoxy. The metal component may be one of copper (Cu), nickel (Ni), palladium (Pd), platinum (Pt), gold (Au), silver (Ag), lead (Pb), tin (Sn), or the like alone, or alloys thereof, but the present disclosure is not limited thereto.

The multilayer capacitor 100 may be mounted on or embedded in an external board (e.g., a printed circuit board), connected to at least one of wires, lands, solders, or bumps of the external board through the first and second external electrodes 131 and 132, and thus electrically connected to a circuit (e.g., an integrated circuit, a processor) that is electrically connected to the external board.

Referring to FIGS. 1, 2 and 3A, the body 110 may include an upper cover layer 112, a lower cover layer 113, and a core region 115, and the core region 115 may include a margin region 114 and a capacitance formation region 116.

The upper and lower cover layers 112 and 113 may be disposed to have the core region 115 interposed therebetween in the first direction (e.g., the Z-direction) and may each have a thickness, greater than a thickness of each of the at least one dielectric layer 111.

The upper and lower cover layers 112 and 113 may prevent external environmental elements (e.g., moisture, plating solution, foreign substances) from penetrating into the core region 115, protect the body 110 from external impacts, and improve bending strength of the body 110.

For example, the upper and lower cover layers 112 and 113 may include the same material as that of the at least one dielectric layer 111 or a different material (e.g., a thermosetting resin such as an epoxy resin).

Since the capacitance formation region 116 may include a region between the at least one first internal electrode 121 and the at least one second internal electrode 122, the capacitance of the multilayer capacitor 100 may be formed.

The capacitance formation region 116 may have a stack structure in which the at least one first internal electrode 121 and the at least one second internal electrode 122 are alternately stacked in the first direction (e.g., the Z-direction) with at least one dielectric layer 111 interposed therebetween, and may have the same size as the stack structure. The margin region 114 may include a region between the boundary line between the at least one first internal electrode 121 and the at least one second internal electrode 122 and the surface of the body 110.

The plurality of margin regions 114 may be disposed to have the capacitance formation region 116 therebetween, in a second direction (e.g., the Y-direction), perpendicular to the first direction (e.g., the Z-direction). For example, the plurality of margin regions 114 may be formed in a manner similar to that of the at least one dielectric layer 111 (a stacking direction is different).

The plurality of margin regions 114 may prevent the at least one first internal electrode 121 and the at least one second internal electrode 122 from being exposed from the body 110 to a surface thereof in the second direction (e.g., the Y-direction). Therefore, external environmental elements (e.g., moisture, plating solution, foreign substances) may be prevented from penetrating into the at least one first internal electrode 121 and the at least one second internal electrode 122 through a surface of the body in the second direction, and reliability and lifespan of the multilayer capacitor 100 may be improved. In addition, since the at least one first internal electrode 121 and the at least one second internal electrode 122 may be formed to efficiently expand in the second direction due to the plurality of margin regions 114, the overlapping area of the first internal electrodes 121 and the second internal electrodes 122 may be increased by the plurality of margin regions 114, thereby contributing to improvement in the capacitance of the multilayer capacitor 100.

Figure 3B:
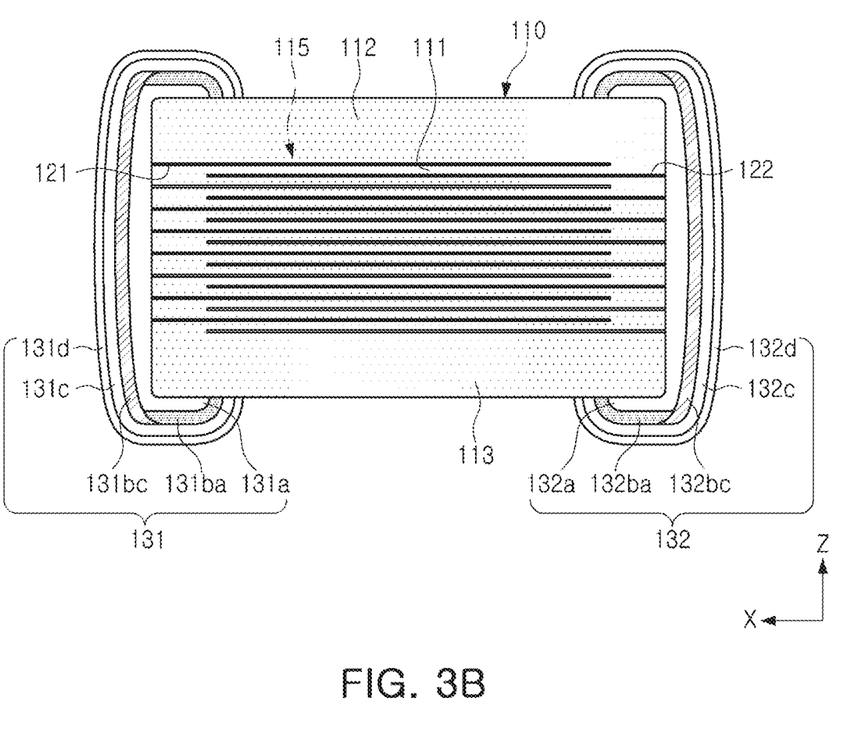
FIG. 3B is a cross-sectional view illustrating an external electrode of a multilayer capacitor according to an embodiment of the present disclosure.
Figure 4A:
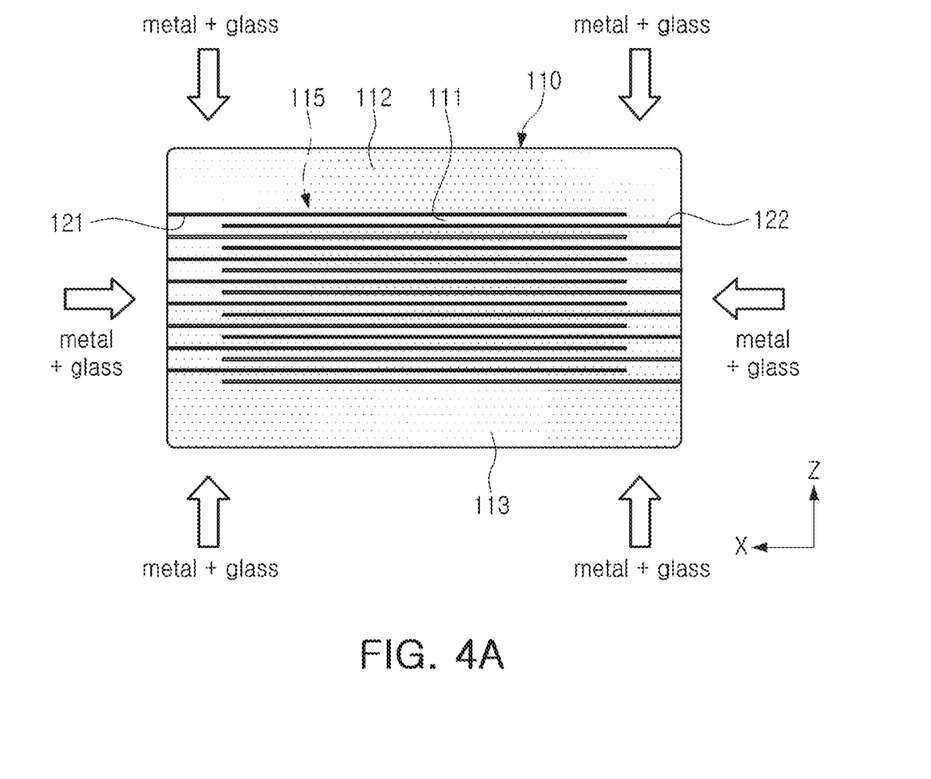
FIG. 4A is a cross-sectional view illustrating formation of a first conductive layer of a multilayer capacitor according to an embodiment of the present disclosure.
Figure 5A:
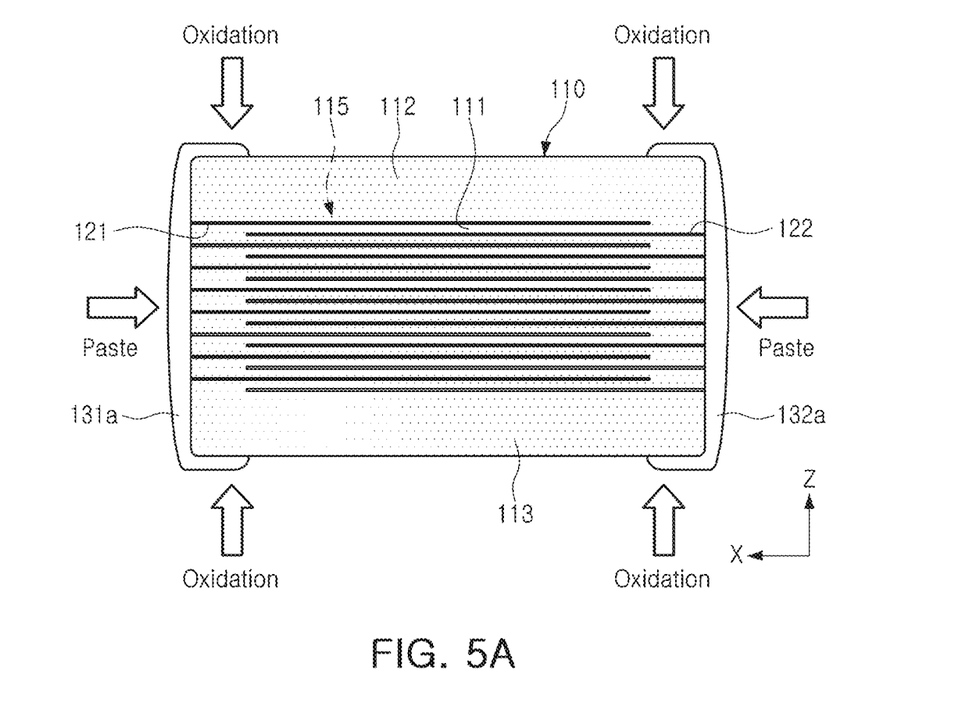
FIG. 5A is a cross-sectional view illustrating formation of a portion of a second conductive layer and an oxide layer of a multilayer capacitor according to an embodiment of the present disclosure.
Figure 6A:
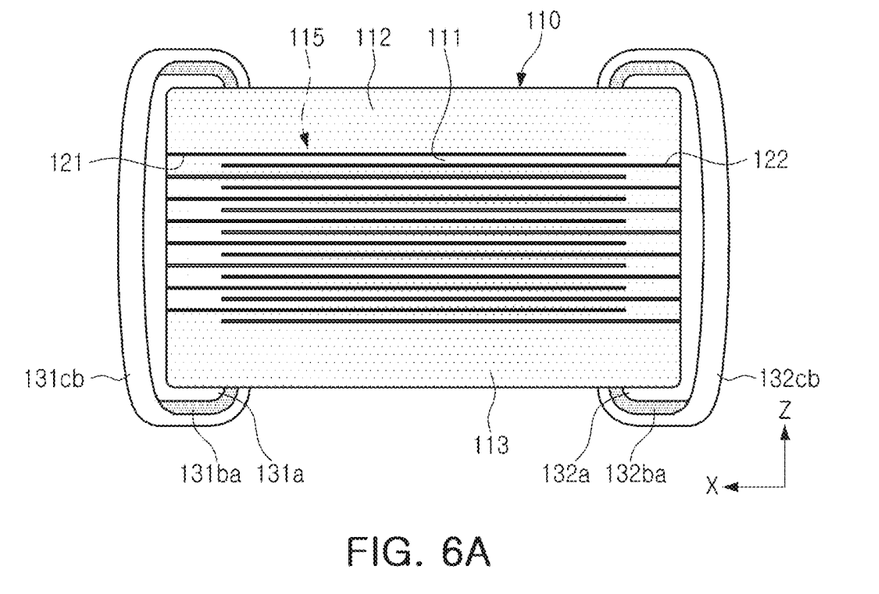
FIG. 6A is a cross-sectional view illustrating a form in which a connection conductive layer and a cover conductive layer of a second conductive layer of a multilayer capacitor are integrated according to an embodiment of the present disclosure.

FIG. 3B is a cross-sectional view illustrating an external electrode of a multilayer capacitor according to an embodiment of the present disclosure, FIG. 4A is a cross-sectional view illustrating formation of a first conductive layer of a multilayer capacitor according to an embodiment of the present disclosure, FIG. 5A is a cross-sectional view illustrating formation of a portion of a second conductive layer and an oxide layer of a multilayer capacitor according to an embodiment of the present disclosure, and FIG. 6A is a cross-sectional view illustrating a form in which a connection conductive layer and a cover conductive layer of a second conductive layer of a multilayer capacitor are integrated according to an embodiment of the present disclosure.

Referring to FIGS. 3B, 4A, 5A and 6A, first and second external electrodes 131 and 132 may include at least a portion of a first conductive layer (131a and 132a), an oxide layer (131ba and 132ba), a second conductive layer (131cb and 132cb), and a plating layer (131d and 132d), respectively, wherein the second conductive layer (131cb and 132cb) may be at least one of a connection conductive layer (131bc and 132bc) and a cover conductive layer (131c and 132c). In FIG. 3B, the first conductive layer (131a and 132a), the oxide layer (131ba and 132ba), the connecting conductive layer (131bc and 132bc), the cover conductive layer (131c and 132c), and the plating layer (131d and 132d) are in contact with an adjacent layer thereof, respectively, but the present disclosure is not limited thereto. For example, a conductive resin layer may be added between the cover conductive layer (131c and 132c) and the plating layer (131d and 132d), and may have a structure in which a thermosetting resin such as an epoxy resin and a conductive material are mixed.

The first conductive layer (131a and 132a) may be disposed on both surfaces of a body 110 in the X-direction, to be connected to at least one first internal electrode 121 and at least one second internal electrode 122.

For example, the first conductive layer (131a and 132a) may be formed by sintering a state in which a portion of the body 110 is dipped into a paste containing a first conductive material (e.g., metal) and/or a glass frit or a state in which the paste is printed a portion of the body 110, or may be formed using a sheet transfer process or a pad transfer process. The first conductive material (e.g., metal) may be nickel (Ni), but the present disclosure is not limited thereto. For example, the first conductive material (e.g., metal) may include at least one of copper (Cu), nickel (Ni), palladium (Pd), platinum (Pt), gold (Au), silver (Ag), or lead (Pb) and may be modified, depending on metal materials of the internal electrodes in the body 110. For example, an average particle size of the paste may be 320 nm, and a binder and a dispersant may be further added to the paste, but the present disclosure is not limited thereto.

The first and second external electrodes 131 and 132 may effectively prevent external foreign substances (e.g., moisture, plating solution, dust, or the like) from penetrating into the body 110, by using the first conductive layer (131a and 132a) having a high density. Alternatively, the first and second external electrodes 131 and 132 may effectively prevent the external foreign substances from penetrating into the body 110, by using a layer disposed on an external surface of the first conductive layer (131a and 132a).

The first conductive layer (131a and 132a) may include glass to have a structure in which the glass is occupied in at least a portion of an empty space less filled with the first conductive material (e.g., metal) of the first conductive layer (131a and 132a). Therefore, a density of the first conductive layer (131a and 132a) may increase, and performance of the first conductive layer (131a and 132a) for prevention of penetration of the external foreign substances may be improved. For example, an amount of the glass in the first conductive layer (131a and 132a) may be 15.5% of an amount of the first conductive material (e.g., metal), but the present disclosure is not limited thereto.

The glass may be classified into first glass and second glass. The first glass may include a Ba-based material and/or a Zn-based material, and may have a relatively high wetting property with respect to a conductive material (e.g., Ni, Cu), as compared to the second glass. Therefore, a density of the conductive layer (131a and 132a) may be improved more efficiently. The second glass may include a Si-based material and a Li-based material, and may have relatively high corrosion resistance to a plating solution, as compared to the first glass. Therefore, a decrease in density of the first conductive layer (131a and 132a) by the plating solution may be effectively prevented. Therefore, the first and second glasses may be in a trade-off relationship with each other.

The oxide layer (131ba and 132ba) may include an oxide, and may be disposed on at least a portion of the external surface of the first conductive layer (131a and 132a). Therefore, the plating solution directing the first conductive layer (131a and 132a) may first be in contact with the oxide layer (131ba and 132ba), and the oxide layer (131ba and 132ba) may prevent the plating solution from penetrating into the first conductive layer (131a and 132a).

Therefore, the glass of the first conductive layer (131a and 132a) may be prevented from being eroded by the plating solution, and the first conductive layer (131a and 132a) may use more efficiently glass having high wetting property with respect to a conductive material (e.g., Ni or Cu), a density thereof may increase more efficiently, and external foreign substances (e.g., moisture, plating solution, dust, or the like) may be effectively prevented from penetrating into the body 110.

The first conductive layer (131a and 132a) is not limited to include glass having high wetting properties, and the first conductive layer (131a and 132a) may not include glass according to a design. For example, since the oxide layer (131ba and 132ba) may prevent penetration of the external foreign substances as well as the plating solution into the body 110, the oxide layer (131ba and 132ba) may be disposed on the external surface of the first conductive layer (131a and 132a), relatively ease for foreign substances to penetrate into the body 110, to uniformly secure performance of the first and second external electrodes 131 and 132 for preventing penetration of the external foreign substances. For example, the oxide layer (131ba and 132ba) may be disposed on at least a portion of an area of the body 110, other than both surfaces of the body 110 in a direction (e.g., the X-direction) in which the first and second external electrodes 131 and 132 face each other, (e.g., the Y-direction and/or the Z-direction), and penetration of the external foreign substances may be prevented by focusing more on a portion in which the external foreign substances are relatively easy to penetrate into the body 110. A total length of an area on which the oxide layer (131ba and 132ba) is disposed in the X-direction may be 30% of a length of the body 110, but the present disclosure is not limited thereto.

The second conductive layer (131cb and 132cb) may include the connection conductive layer (131bc and 132bc) and the cover conductive layer (131c and 132c), and may be disposed on an external surface of the first conductive layer (131a and 132a) and/or an external surface of the oxide layer (131ba and 132ba). For example, the second conductive layer (131cb and 132cb) may be formed by the same formation process as the first conductive layer (131a and 132a) (e.g., a sintering-after-dipping process, a sintering-after-printing process, or a transfer process).

The connection conductive layer (131bc and 132bc) and/or the cover conductive layer (131c and 132c) of the second conductive layer (131cb and 132cb) may include a second conductive material (e.g., Cu) having a standard reduction potential, higher than a standard reduction potential of the first conductive material (e.g., Ni). Therefore, the first conductive layer (131a and 132a) including the first conductive material (e.g., Ni) may be sintered in a relatively reducing atmosphere, and the connection conductive layer (131bc and 132bc) and/or the cover conductive layer (131c and 132c), including the second conductive material (e.g., Cu), may be sintered in a relatively oxidizing atmosphere (e.g., an atmosphere that contains oxygen gas). For example, each of the first conductive layer (131a and 132a) and the second conductive layer (131cb and 132cb) may be a sintered layer, but the present disclosure is not limited thereto. The connection conductive layer (131bc and 132bc) and/or the cover conductive layer (131c and 132c) may include a second conductive material having high conductivity, such as copper (Cu), to also secure conductivities of the first and second external electrodes 131 and 132.

First, a paste, which may be prepared as a connection conductive layer (131bc and 132bc), may be disposed only on a portion of the external surface of the first conductive layer (131a and 132a) (e.g., a surface of the body 110 from which the internal electrodes are exposed). For example, the connection conductive layer (131bc and 132bc) may be in contact with the other surface (e.g., an external surface) of the first conductive layer (131a and 132a), opposite to a portion of an inner surface of the first conductive layer (131a and 132a) contacting the at least one first internal electrode 121 or the at least one second internal electrode 122. For example, the paste may be disposed on the body 110 using a 3-roll milling machine, but the present disclosure is not limited thereto.

Thereafter, the paste may be sintered in an oxidizing atmosphere to form a connection conductive layer (131bc and 132bc). For example, a sintering temperature may be 650 degrees Celsius or more, may be 650 degrees Celsius or more and 900 degrees Celsius or less, and may vary depending on particle size distribution of the paste or a type of glass. In this case, a first conductive material (e.g., Ni) in an area of the external surfaces of the first conductive layer (131a and 132a) on which the connection conductive layer (131bc and 132bc) is not disposed (e.g., a surface of the body 110 in the Z-direction and/or a surface of the body 110 in the Y-direction) may be oxidized to $NiO_2$. The $NiO_2$ may be provided as the oxide layer (131ba and 132ba). The $NiO_2$ may be an example of an oxide of the first conductive material (e.g., metal), and may vary depending on the first conductive material (e.g., metal). The presence of the oxide of the first conductive material may be determined by methods known to one of ordinary skill in the art and may include, for example, energy dispersive X-ray spectroscopy (EDS) coupled with transmission electron microscopy (TEM) or scanning electron microscope (SEM). The oxide layer (131ba and 132ba) may be disposed on at least a portion of an area of the body 110, other than both surfaces of the body 110 in a direction in which the first and second external electrodes 131 and 132 face each other (e.g., the X-direction), and may not be disposed on at least a portion of an area of the external surface of the first conductive layer (131a and 132a) in the direction in which the first and second external electrodes 131 and 132 face each other (e.g., the X-direction), but the present disclosure is not limited thereto.

Thereafter, the cover conductive layer (131c and 132c) may be formed together on the external surface of the connection conductive layer (131bc and 132bc) and the external surface of the oxide layer (131ba and 132ba). Since the cover conductive layer (131c and 132c) may be formed in the same manner as the connection conductive layer (131bc and 132bc) is formed, the cover conductive layer (131c and 132c) and the connection conductive layer (131bc and 132bc) may be integrally defined as the second conductive layer (131cb and 132cb). Clarity of an interface between the cover conductive layer (131c and 132c) and the connection conductive layer (131bc and 132bc) in the second conductive layer (131cb and 132cb) may vary depending on a design or a viewpoint.

The second conductive layer (131cb and 132cb) may be in contact with only a portion of the external surfaces of the first conductive layer (131a and 132a), but the present disclosure is not limited thereto. The oxide layer (131ba and 132ba) may be disposed between other portions of the external surfaces of the first conductive layer (131a and 132a) and the second conductive layer (131cb and 132cb). A portion of the second conductive layer (131cb and 132cb) contacting the external surfaces of the first conductive layer (131a and 132a) may be relatively thick, as compared to other portions thereof, and may protect the oxide layer (131ba and 132ba) from penetration of the plating solution, in a similar manner to preventing penetration of the plating solution into the first conductive layer (131a and 132a).

The plating layer (131d and 132d) may be formed on the external surface of the second conductive layer (131cb and 132cb) and/or the external surface of the cover conductive layer (131c and 132c). The plating layer (131d and 132d) may be formed by a sputtering process or an electric deposition process, but the present disclosure is not limited thereto. For example, the plating layer (131d and 132d) may contain tin (Sn) having a melting point, lower than a temperature of a reflow process, to have efficiency when the first and second external electrodes 131 and 132 are electrically connected to and fixed to a substrate through a solder by a reflow process, and may contain nickel (Ni) to increase adhesion to the cover conductive layer (131c and 132c), but the present disclosure is not limited thereto. For example, the plating layer (131d and 132d) may contain an alternative material such as palladium (Pd) or platinum (Pt) depending on purposes of the multilayer capacitor (e.g., for high voltage), or may be implemented with copper (Cu), palladium (Pd), platinum (Pt), gold (Au), silver (Ag), lead (Pb), or the like alone or an alloy thereof. Depending on a design, the plating layer (131d and 132d) may have a structure in which a plurality of plating layers including an inner plating layer containing nickel (Ni) and an outer plating layer containing tin (Sn) are plated.

Figure 4B:
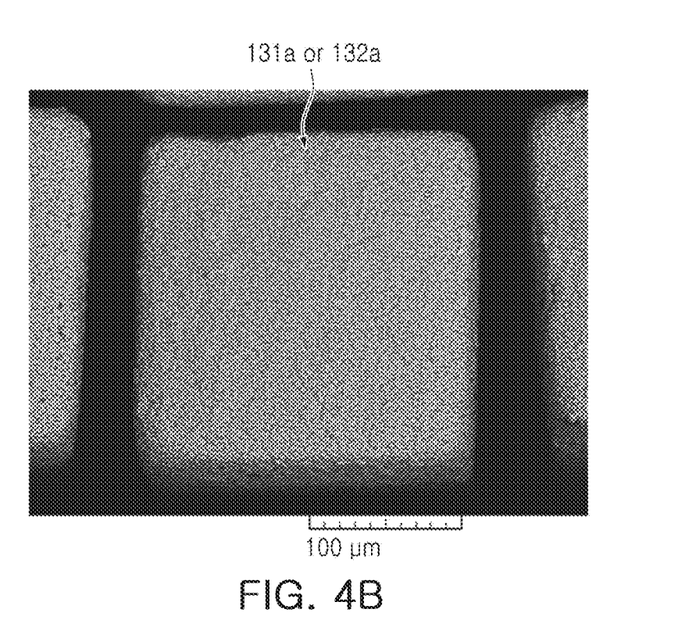
FIG. 4B is a photograph illustrating an external surface of a first conductive layer including glass of a multilayer capacitor according to an embodiment of the present disclosure in the X-direction.
Figure 4C:
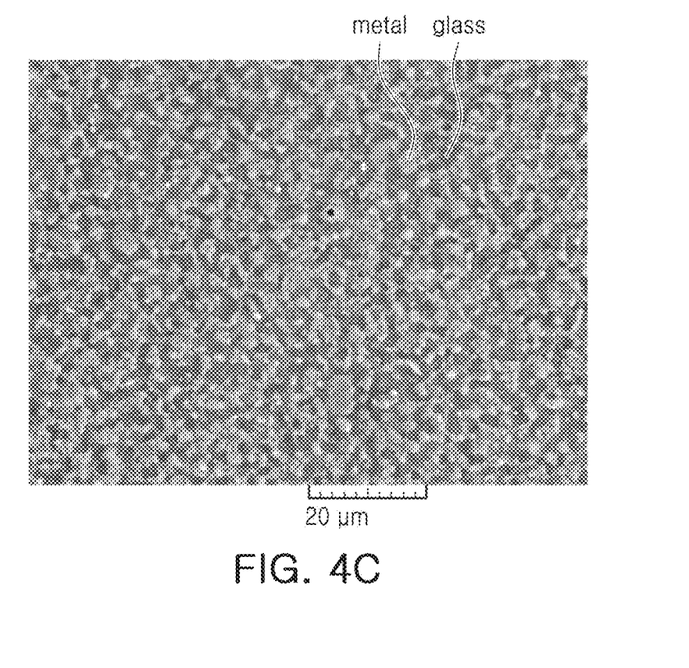
FIG. 4C is an enlarged photograph illustrating an external surface of a first conductive layer including first glass of a multilayer capacitor according to an embodiment of the present disclosure in the X-direction.
Figure 4D:
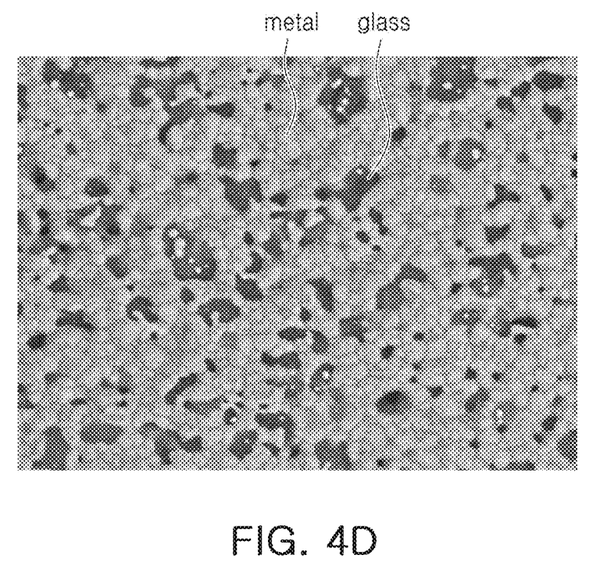
FIG. 4D is an enlarged photograph illustrating an external surface of a first conductive layer including second glass of a multilayer capacitor according to an embodiment of the present disclosure in the X-direction.
Figure 4E:
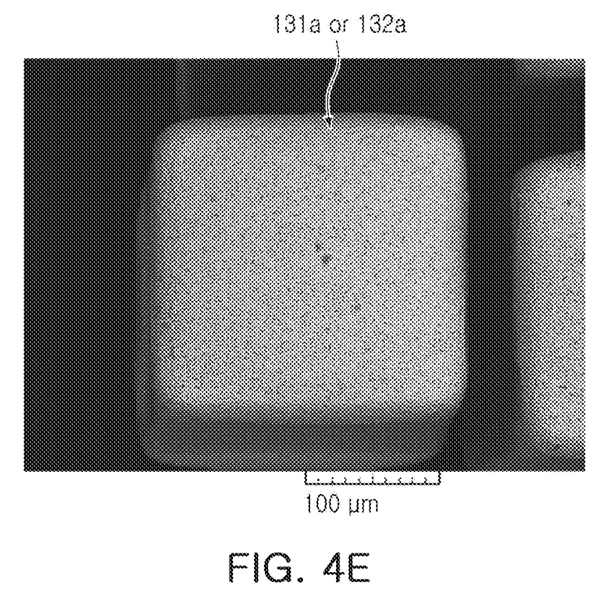
FIG. 4E is a photograph illustrating an external surface of a first conductive layer that does not include glass of a multilayer capacitor according to an embodiment of the present disclosure in the X-direction view.
Figure 4F:
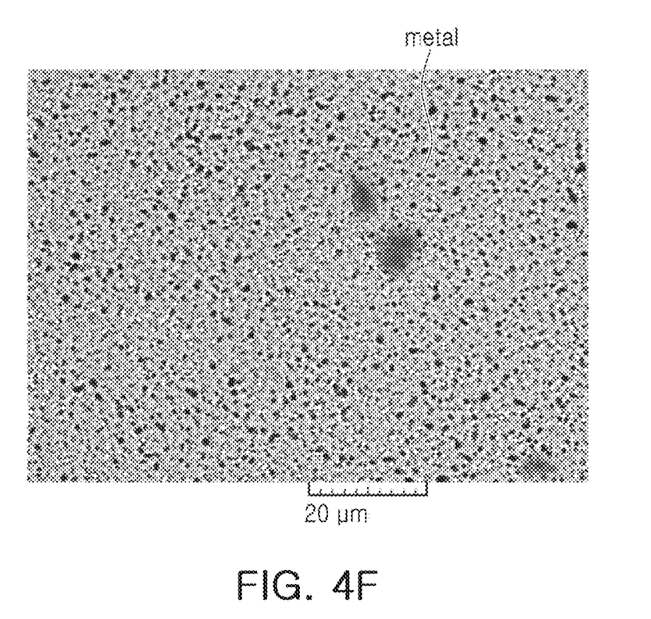
FIG. 4F is an enlarged photograph illustrating an external surface of a first conductive layer that does not include glass of a multilayer capacitor according to an embodiment of the present disclosure in the X-direction.

FIG. 4B is a photograph illustrating an external surface of a first conductive layer including glass of a multilayer capacitor according to an embodiment of the present disclosure in the X-direction, FIG. 4C is an enlarged photograph illustrating an external surface of a first conductive layer including first glass of a multilayer capacitor according to an embodiment of the present disclosure in the X-direction, FIG. 4D is an enlarged photograph illustrating an external surface of a first conductive layer including second glass of a multilayer capacitor according to an embodiment of the present disclosure in the X-direction, FIG. 4E is a photograph illustrating an external surface of a first conductive layer that does not include glass of a multilayer capacitor according to an embodiment of the present disclosure in the X-direction view, and FIG. 4F is an enlarged photograph illustrating an external surface of a first conductive layer that does not include glass of a multilayer capacitor according to an embodiment of the present disclosure in the X-direction.

Referring to FIG. 4C, a first conductive layer may include first glass including at least one of a Ba-based material or a Zn-based material, and a first conductive material (e.g., metal) and the first glass may have a structure that may be relatively evenly distributed throughout the first conductive layer. Therefore, the first conductive layer may have a hermetic sealing structure, since the first glass may have a relatively high wetting property with respect to a conductive material (e.g., Ni, Cu). In this case, an oxide layer and/or a relatively thick second conductive layer may prevent penetration of a plating solution onto an external surface of the first conductive layer.

Referring to FIG. 4D, a first conductive layer may include second glass including at least one of a Si-based material or a Li-based material, and may secure corrosion resistance to a plating solution. In this case, an oxide layer and/or a relatively thick second conductive layer may prevent external foreign substances from penetrating onto an external surface of the first conductive layer.

Referring to FIGS. 4E and 4F, since a first conductive layer may include a first conductive material (e.g., metal) and may not include glass, the first conductive layer may be implemented without considering corrosion resistance to a plating solution. In this case, an oxide layer and/or a relatively thick second conductive layer may prevent external foreign substances from penetrating onto an external surface of the first conductive layer.

Figure 5B:
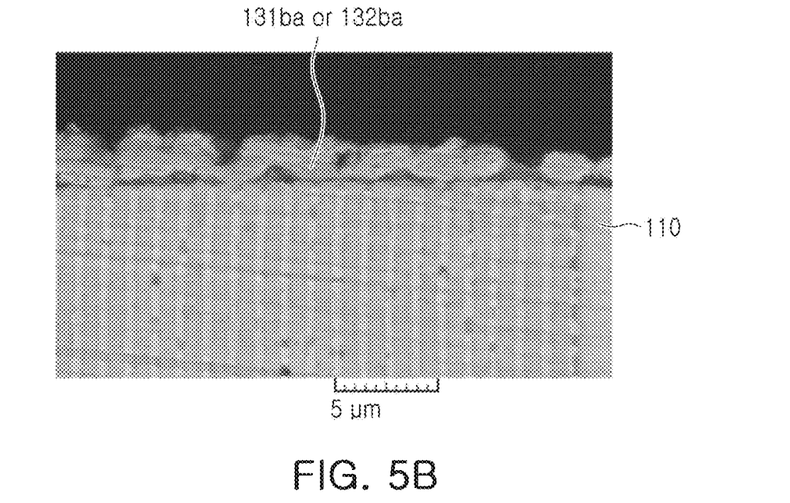
FIG. 5B is a cross-sectional photograph illustrating a state before a plating solution is deposited on an oxide layer of a multilayer capacitor according to an embodiment of the present disclosure.
Figure 5C:
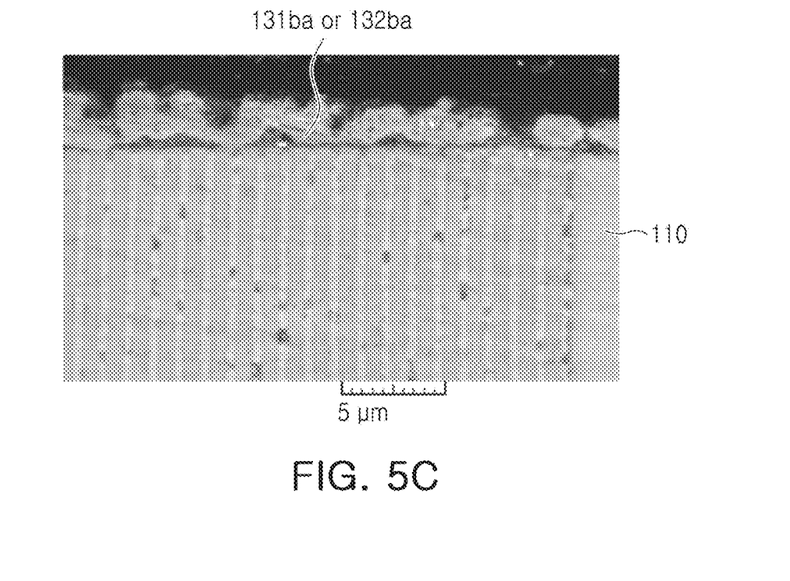
FIG. 5C is a cross-sectional view illustrating a state after a plating solution is deposited on an oxide layer of a multilayer capacitor according to an embodiment of the present disclosure.
Figure 6B:
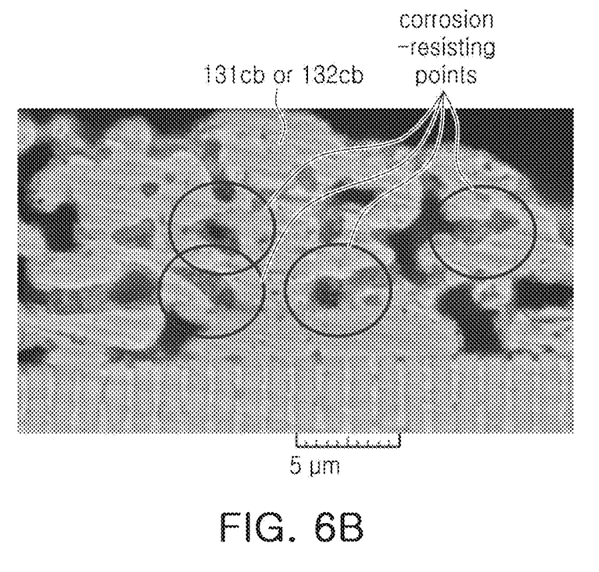
FIG. 6B is a cross-sectional photograph illustrating a state before a plating solution is deposited on a second conductive layer of a multilayer capacitor according to an embodiment of the present disclosure.

FIG. 5B is a cross-sectional photograph illustrating a state before a plating solution is deposited on an oxide layer of a multilayer capacitor according to an embodiment of the present disclosure, and FIG. 5C is a cross-sectional view illustrating a state after a plating solution is deposited on an oxide layer of a multilayer capacitor according to an embodiment of the present disclosure. FIG. 6B is a cross-sectional photograph illustrating a state before a plating solution is deposited on a second conductive layer of a multilayer capacitor according to an embodiment of the present disclosure, and FIG. 6C is a cross-sectional photograph illustrating a state after a plating solution is deposited on a second conductive layer of a multilayer capacitor according to an embodiment of the present disclosure.

Referring to FIGS. 5B and 6B, an oxide layer (131ba and 132ba) and/or a second conductive layer (131cb and 132cb) may include a plating solution corrosion-resisting point.

Figure 6C:
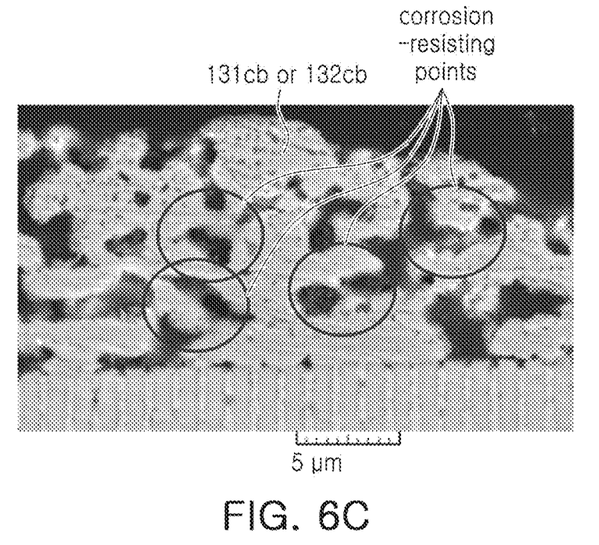
FIG. 6C is a cross-sectional photograph illustrating a state after a plating solution is deposited on a second conductive layer of a multilayer capacitor according to an embodiment of the present disclosure.

Referring to FIGS. 5C and 6C, an oxide layer (131ba and 132ba) and/or a second conductive layer (131cb and 132cb) may prevent an Ni plating solution from penetrating into a body 110 or a first conductive layer, through a plating solution erosion-resisting point in an environment in which the Ni plating solution is immersed at a temperature of 55 degrees Celsius for 10 minutes.

The photos of FIGS. 4B to 4F, 5B, 5C, 6B, and 6C may be obtained by applying a cross-section or a contour of a multilayer capacitor to analysis using at least one of a micrometer, a transmission electron microscopy (TEM), an atomic force microscope (AFM), a scanning electron microscope (SEM), an optical microscope, or a surface profiler. The cross-section may be obtained by grinding or cutting the multilayer capacitor in the Z- or Y-direction to expose an X-Y plane or an X-Z plane including a center of the multilayer capacitor. Layers may be identified by classification of color and/or brightness of pixels of the photos, and a material and/or presence or absence of plating solution erosion of each of the layers may be identified by comparing color and/or brightness in each of the layers to values within a specific range.

Although the embodiments of the present disclosure have been described in detail above, the present disclosure is not limited by the above-described embodiments and the accompanying drawings, but is intended to be limited by the appended claims. A multilayer capacitor according to an embodiment of the present disclosure may effectively improve performance of an external electrode (e.g., at least portion of reliability, durability, stacking stability, or reduction in equivalent series resistance).

While example embodiments have been shown and described above, it will be apparent to those skilled in the art that modifications and variations could be made without departing from the scope of the present disclosure as defined by the appended claims.

What is claimed is:

1. A multilayer capacitor comprising:
 a body including a stack structure in which at least one first internal electrode and at least one second internal electrode are alternately stacked in a first direction with at least one dielectric layer interposed therebetween thereby defining a capacitance formation region; and
 first and second external electrodes spaced apart from each other and disposed on the body to be respectively connected to the at least one first internal electrode and the at least one second internal electrode,
 wherein each of the first and second external electrodes includes:
 a first conductive layer including a first conductive material and glass; and
 an oxide layer including an oxide and disposed on at least a portion of an external surface of the first conductive layer which overlaps the body in the first direction, and
 wherein the oxide layer is not disposed on at least a portion of an area of the external surface of the first conductive layer which overlaps the capacitance formation region in a direction in which the first and second external electrodes face each other.

2. The multilayer capacitor of claim 1, wherein the glass comprises at least one of a Ba-based material and a Zn-based material.

3. The multilayer capacitor of claim 1, wherein the oxide comprises an oxide of the first conductive material.

4. The multilayer capacitor of claim 3, wherein the first conductive material comprises Ni.

5. The multilayer capacitor of claim 1, wherein each of the first and second external electrodes further comprises:
 a second conductive layer, at least a portion of which is disposed on an external surface of the oxide layer; and
 a plating layer, at least a portion of which is disposed on an external surface of the second conductive layer.

6. The multilayer capacitor of claim 5, wherein each of the first and second conductive layers is a sintered layer.

7. The multilayer capacitor of claim 5, wherein a portion of the second conductive layer is disposed on an area of the external surface of the first conductive layer in which the oxide layer is not disposed, and the second conductive layer comprises a second conductive material having a standard reduction potential, higher than a standard reduction potential of the first conductive material.

8. The multilayer capacitor of claim 1, wherein each of the first and second external electrodes further comprises a second conductive layer including a second conductive material having a standard reduction potential, higher than a standard reduction potential of the first conductive material, and disposed on at least a portion of the external surface of the first conductive layer.

9. The multilayer capacitor of claim 8, wherein the second conductive layer comprises:
 a connection conductive layer including the second conductive material and contacting the other surface of the first conductive layer, opposite to a portion of an inner surface of the first conductive layer contacting the at least one first internal electrode or the at least one second internal electrode; and
 a cover conductive layer including the second conductive material and disposed on an external surface of the connection conductive layer and an external surface of the oxide layer.

10. The multilayer capacitor of claim 8, wherein the second conductive layer is in contact with the other surface of the first conductive layer, opposite to a portion of an inner surface of the first conductive layer contacting the at least one first internal electrode or the at least one second internal electrode.

11. The multilayer capacitor of claim 8, wherein the second conductive material comprises Cu.

12. A multilayer capacitor comprising:
 a body including a stack structure in which at least one first internal electrode and at least one second internal electrode are alternately stacked in a first direction with at least one dielectric layer interposed therebetween thereby defining a capacitance formation region; and
 first and second external electrodes spaced apart from each other and disposed on the body to be respectively connected to the at least one first internal electrode and the at least one second internal electrode,
 wherein each of the first and second external electrodes includes:
 a first conductive layer including a first conductive material;
 a second conductive layer including a second conductive material having a standard reduction potential, higher than a standard reduction potential of the first conductive material, and contacting a portion of an external surface of the first conductive layer; and
 an oxide layer disposed between another portion of the external surface of the first conductive layer, overlapping the body in the first direction, and the second conductive layer, and including an oxide of the first conductive material, and
 wherein the oxide layer is disposed on a portion of an area of the body, other than respective portions of both surfaces of the body which overlap the capacitance formation region in a direction in which the first and second external electrodes face each other.

13. The multilayer capacitor of claim 12, wherein the second conductive layer comprises:
 a connection conductive layer including the second conductive material and contacting the other surface of the first conductive layer, opposite to a portion of an inner surface of the first conductive layer contacting the at least one first internal electrode or the at least one second internal electrode; and
 a cover conductive layer including the second conductive material and disposed on an external surface of the connection conductive layer and an external surface of the oxide layer.

14. The multilayer capacitor of claim 12, wherein each of the first and second external electrodes further comprises a plating layer disposed on an external surface of the second conductive layer, and
 each of the first and second conductive layers is a sintered layer.

15. The multilayer capacitor of claim 12, wherein the first conductive material comprises Ni, and
 the second conductive material comprises Cu.

16. A method of manufacturing a multilayer capacitor comprising:
 forming a second conductive layer on a first conductive layer disposed on a portion of a body of the multilayer capacitor, the forming of the second conductive layer includes contacting a paste with a first portion of an external surface of the first conductive layer but not a second portion of the external surface of the first conductive layer, wherein the first conductive layer includes a first conductive material and a glass frit; and
 oxidizing the second portion of the external surface of the first conductive layer to form an oxide layer including an oxide,
 wherein the body includes a stack structure in which at least one first internal electrode and at least one second internal electrode are alternately stacked in a first direction with at least one dielectric layer interposed therebetween thereby defining a capacitance formation region,
 wherein the second portion overlaps the body in the first direction, and
 wherein the oxide layer is not disposed on at least a portion of opposing surfaces of the body which overlaps the capacitance formation region in a direction orthogonal to the first direction.

17. The method of claim 16, wherein the oxide layer is disposed on at least a portion of the body.

18. The method of claim 16, wherein the oxide layer is disposed on at least a portion of opposing surfaces of the body in the first direction.

19. The method of claim 16, wherein the second conductive layer comprises a second conductive material having a standard reduction potential higher than a standard reduction potential of the first conductive material.

20. The method of claim 16, wherein the second conductive material comprises Cu.

21. The method of claim 16, wherein the first conductive material comprises a metal.

22. The method of claim 21, wherein the metal includes Ni.

23. The method of claim 22, wherein the oxide includes $NiO_2$.

24. The method of claim 16, wherein the oxide comprises an oxide of the first conductive material.

* * * * *